(12) United States Patent
Scholten

(10) Patent No.: US 10,768,031 B2
(45) Date of Patent: Sep. 8, 2020

(54) AIR DUCT AIRFLOW SENSOR

(71) Applicant: JOHNSON CONTROLS, INC., Milwaukee, WI (US)

(72) Inventor: Jean H. Scholten, Roswell, GA (US)

(73) Assignee: Johnson Controls, Inc., Milwaukee, WI (US)

( * ) Notice: Subject to any disclaimer, the term of this patent is extended or adjusted under 35 U.S.C. 154(b) by 14 days.

(21) Appl. No.: 16/251,011

(22) Filed: Jan. 17, 2019

(65) Prior Publication Data

US 2019/0219430 A1 Jul. 18, 2019

Related U.S. Application Data

(60) Provisional application No. 62/618,142, filed on Jan. 17, 2018.

(51) Int. Cl.

| | | |
|---|---|---|
| G01F 1/68 | (2006.01) | |
| G01F 1/40 | (2006.01) | |
| F24F 11/74 | (2018.01) | |
| F24F 11/49 | (2018.01) | |
| G01F 1/684 | (2006.01) | |
| G01F 5/00 | (2006.01) | |
| G05D 7/00 | (2006.01) | |

(Continued)

(52) U.S. Cl.
CPC ............ *G01F 1/684* (2013.01); *F24F 11/30* (2018.01); *F24F 11/49* (2018.01); *F24F 11/74* (2018.01); *F24F 13/10* (2013.01); *G01F 1/40* (2013.01); *G01F 5/00* (2013.01); *G05D 7/00* (2013.01); *F24F 2110/40* (2018.01)

(58) Field of Classification Search
CPC ..... G01F 1/68; G01F 1/40; F24F 11/74; F24F 11/49
See application file for complete search history.

(56) References Cited

U.S. PATENT DOCUMENTS 5,289,819 A 3/1994 Kroger et al.
5,586,861 A 12/1996 Berger
(Continued)

FOREIGN PATENT DOCUMENTS

CN 201688962 U 12/2010
EP 1 783 409 A1 5/2007
(Continued)

OTHER PUBLICATIONS

International Search Report and Written Opinion for International Application No. PCT/US2019/014085, dated Jun. 21, 2019, 20 pages.

*Primary Examiner* — Jewel V Dowtin
(74) *Attorney, Agent, or Firm* — Foley & Lardner LLP

(57) ABSTRACT

An airflow sensor assembly for an air duct is provided. The airflow sensor assembly includes an air duct having an interior wall and an exterior wall, a high pressure detection device, and a low pressure detection device. The low pressure detection device includes a hollow ring disposed within the interior wall of the air duct. The hollow ring includes an inner periphery portion, an outer periphery portion, and a first set of apertures defined therein. The first set of apertures is spaced around the inner periphery portion of the hollow ring. The airflow sensor assembly further includes a pressure sensor fluidly coupled to the high pressure detection device and the low pressure detection device.

20 Claims, 7 Drawing Sheets

(51) Int. Cl.
*F24F 11/30* (2018.01)
*F24F 13/10* (2006.01)
*F24F 110/40* (2018.01)

(56) References Cited

U.S. PATENT DOCUMENTS

| | | |
|---|---|---|
| 7,392,826 B2 | 7/2008 | Schub et al. |
| 8,430,731 B2 | 4/2013 | Bamberger |
| 9,068,867 B2 | 6/2015 | Ayers et al. |
| 9,512,925 B2 * | 12/2016 | Shanker .................. F16K 1/221 |
| 9,964,421 B1 | 5/2018 | Buckley et al. |
| 10,060,617 B2 * | 8/2018 | Horng ..................... F21V 15/01 |
| 10,260,537 B2 * | 4/2019 | Sawchuk ............... F15D 1/0005 |
| 10,365,143 B2 * | 7/2019 | Sawchuk ................ F16L 41/06 |
| 2004/0238046 A1 | 12/2004 | Hoffman et al. |
| 2016/0263967 A1 | 9/2016 | Schaake |
| 2017/0248237 A1 | 8/2017 | Kabierschke et al. |
| 2017/0254557 A1 * | 9/2017 | Chiu ........................ F24F 1/04 |

FOREIGN PATENT DOCUMENTS

| | | |
|---|---|---|
| EP | 2 508 815 A1 | 10/2012 |
| FR | 2748308 A1 | 11/1997 |
| JP | H01-311911 A1 | 12/1989 |
| JP | 2018-076008 A | 5/2018 |
| WO | WO-2017/183365 A1 | 10/2017 |

\* cited by examiner

Section B-B

Detail D-D

Detail C-C

AIR DUCT AIRFLOW SENSOR

CROSS-REFERENCE TO RELATED PATENT APPLICATIONS

This application claims the benefit of and priority to U.S. Provisional Patent Application No. 62/618,142 filed Jan. 17, 2018, the entire disclosure of which is incorporated by reference herein.

BACKGROUND

The present disclosure relates, in exemplary embodiments, to air duct airflow sensors. Air dampers are mechanical valves used to permit, block, and control the flow of air in air ducts. Typically, a pressure sensor is incorporated to detect and measure the air pressure in the air duct. Pressure measurement can be used to determine the desire amount of airflow and to actuate a damper to open or close, thus affecting airflow.

It would be desirable to have an airflow sensor that would not be dependent on airflow orientation so as to permit location of sensor closer to a bend in the air duct than conventional sensors can be positioned. It would be desirable to have an airflow sensor less susceptible to clogging.

SUMMARY

One implementation of the present disclosure is an airflow sensor assembly for an air duct. The airflow sensor assembly includes an air duct having an interior wall and an exterior wall, a high pressure detection device, and a low pressure detection device. The low pressure detection device includes a hollow ring disposed within the interior wall of the air duct. The hollow ring includes an inner periphery portion, an outer periphery portion, and a first set of apertures defined therein. The first set of apertures is spaced around the inner periphery portion of the hollow ring. The airflow sensor assembly further includes a pressure sensor fluidly coupled to the high pressure detection device and the low pressure detection device.

In some embodiments, wherein the low pressure detection device includes a first connecting opening disposed within the outer periphery portion of the hollow ring and a first tube fluidly coupled to the first connecting opening. In other embodiments, the high pressure detection device includes a second set of apertures defined therein and spaced around the inner periphery of the air duct, a gasket having a recessed area defined therein and a second connecting opening, the gasket being fitted over the exterior wall and proximate the second plurality of apertures, and a second tube fluidly coupled to the second connecting opening. In further embodiments, the pressure sensor is fluidly coupled to the first tube and the second tube. In still further embodiments, the airflow sensor assembly includes a gasket guard ring configured to fit over an exterior surface of the gasket.

In some embodiments, the airflow sensor assembly includes a damper control assembly that is communicably coupled to the pressure sensor. In other embodiments, the damper control assembly includes an air damper assembly, a motor, and an actuator.

In some embodiments, each of the first set of apertures is orthogonal to a direction of airflow through the air duct.

In some embodiments, the hollow ring has an outer diameter ranging from 0.5 inches to 0.75 inches.

Another implementation of the present disclosure is an airflow sensor assembly for an air duct. The airflow sensor assembly includes an air duct having an interior wall and an exterior wall, a high pressure detection device, and a low pressure detection device. The low pressure detection device includes an airflow restrictor, a first set of apertures defined therein and spaced around a periphery of the air duct, a first gasket having a recessed area defined therein and a first connecting opening. The first gasket is fitted over the exterior wall and proximate the first plurality of apertures and the airflow restrictor. The lower pressure detection device further includes a first tube fluidly coupled to the first connecting opening. The airflow sensor assembly further includes a pressure sensor fluidly coupled to the high pressure detection device and the low pressure detection device.

In some embodiments, the airflow restrictor includes a shroud component coupled with the interior wall of the air duct. In other embodiments, the airflow restrictor includes a channel disposed in the interior wall of the air duct.

In some embodiments, the high pressure detection device includes a second set of apertures defined therein and spaced around the inner periphery of the air duct, a gasket having a recessed area defined therein and a second connecting opening, the gasket being fitted over the exterior wall and proximate the second plurality of apertures, and a second tube fluidly coupled to the second connecting opening. In other embodiments, the pressure sensor is fluidly coupled to the first tube and the second tube.

In some embodiments, the airflow sensor assembly includes one or more gasket guard rings configured to fit over at least one of an exterior surface of the first gasket or an exterior surface of the second gasket.

In some embodiments, the airflow sensor assembly includes a damper control assembly that is communicably coupled to the pressure sensor. In other embodiments, the damper control assembly includes an air damper assembly, a motor, and an actuator.

Yet another implementation of the present disclosure is a method of sensing airflow in an air duct. The method includes receiving a high air pressure measurement from a high pressure detection device, and receiving a low air pressure measurement from a low pressure detection device. The low pressure detection device includes a hollow ring disposed within the interior wall of the air duct. The hollow ring includes an inner periphery portion, an outer periphery portion, and a first set of apertures defined therein. The first set of apertures is spaced around the inner periphery portion of the hollow ring. The low pressure detection device further includes a first connecting opening disposed within the outer periphery portion of the hollow ring, and a first tube fluidly coupled to the first connecting opening. The method further includes calculating an air velocity through the duct based on the high air pressure measurement and the low air pressure measurement.

In some embodiments, the high pressure detection device includes a second set of apertures defined therein and spaced around the inner periphery of the air duct, a gasket having a recessed area defined therein and a second connecting opening, the gasket being fitted over the exterior wall and proximate the second plurality of apertures, and a second tube fluidly coupled to the second connecting opening.

In some embodiments, each of the first set of apertures is orthogonal to a direction of airflow through the air duct.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The drawings disclose exemplary embodiments in which like reference characters designate the same or similar parts throughout the figures of which.

DETAILED DESCRIPTION

Unless otherwise indicated, the drawings are intended to be read (for example, cross-hatching, arrangements of parts, proportion, degree, or the like) together with the specification, and are to be considered a portion of the entire written description of this invention. As used in the following description, the terms "horizontal", "vertical", "left", "right", "up" and "down", "upper" and "lower" as well as adjectival and adverbial derivatives thereof (for example, horizontally", "upwardly", or the like), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 1:
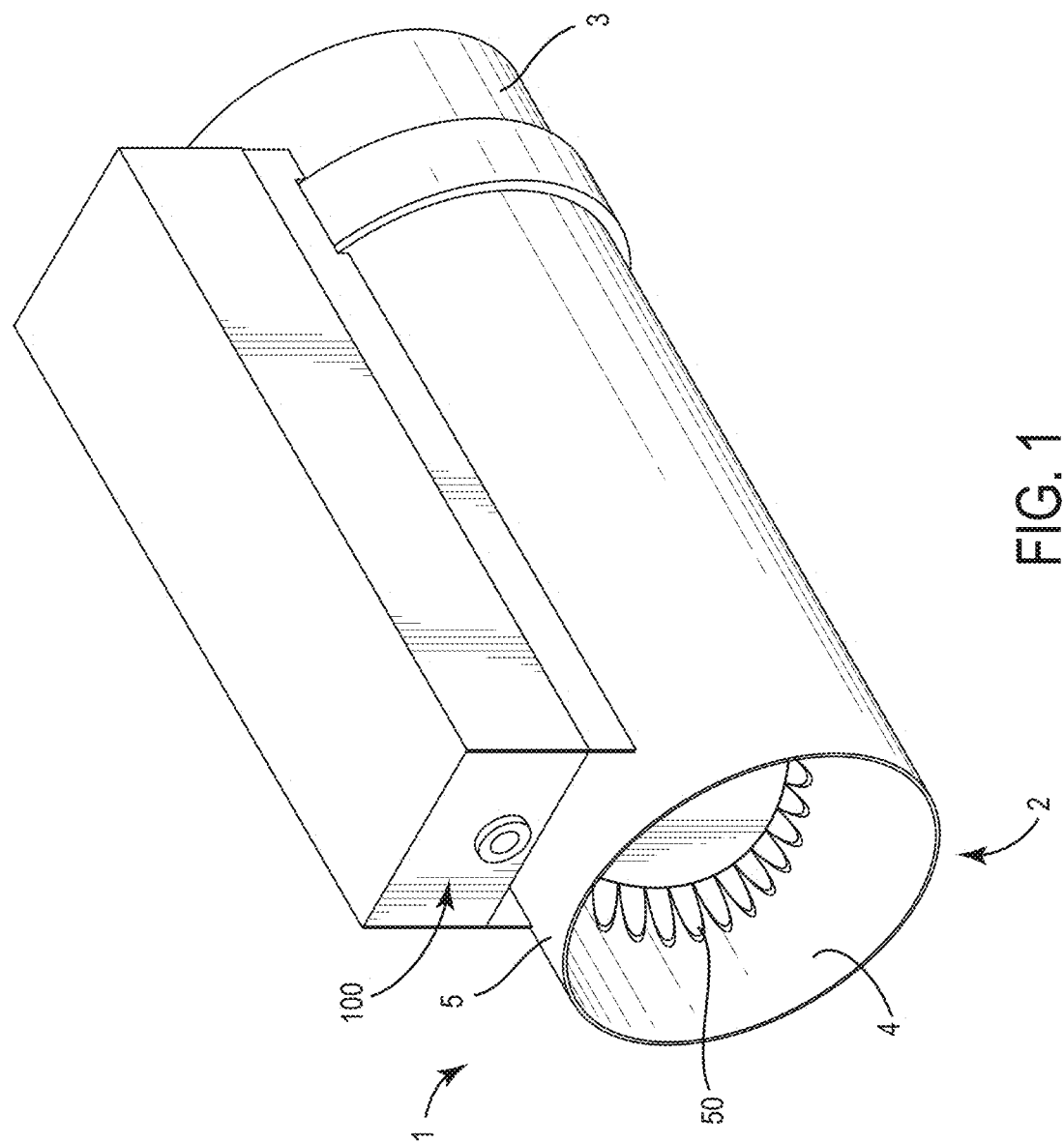
FIG. 1 is an isometric view of an air duct assembly, according to some embodiments.

FIG. 1 depicts an isometric view of a cylindrical air duct assembly 1. As shown, the air duct assembly 1 includes a first end 2, a second end 3, and interior wall 4, an exterior wall 5, and a control assembly 100. Air duct assembly 1 is further shown to include an air damper assembly 50 situated within the interior wall 4 to control the volume of air flowing through the cylindrical air duct assembly 1. In some embodiments, the diameter of the interior wall 4 is approximately 10 inches.

Figure 2:
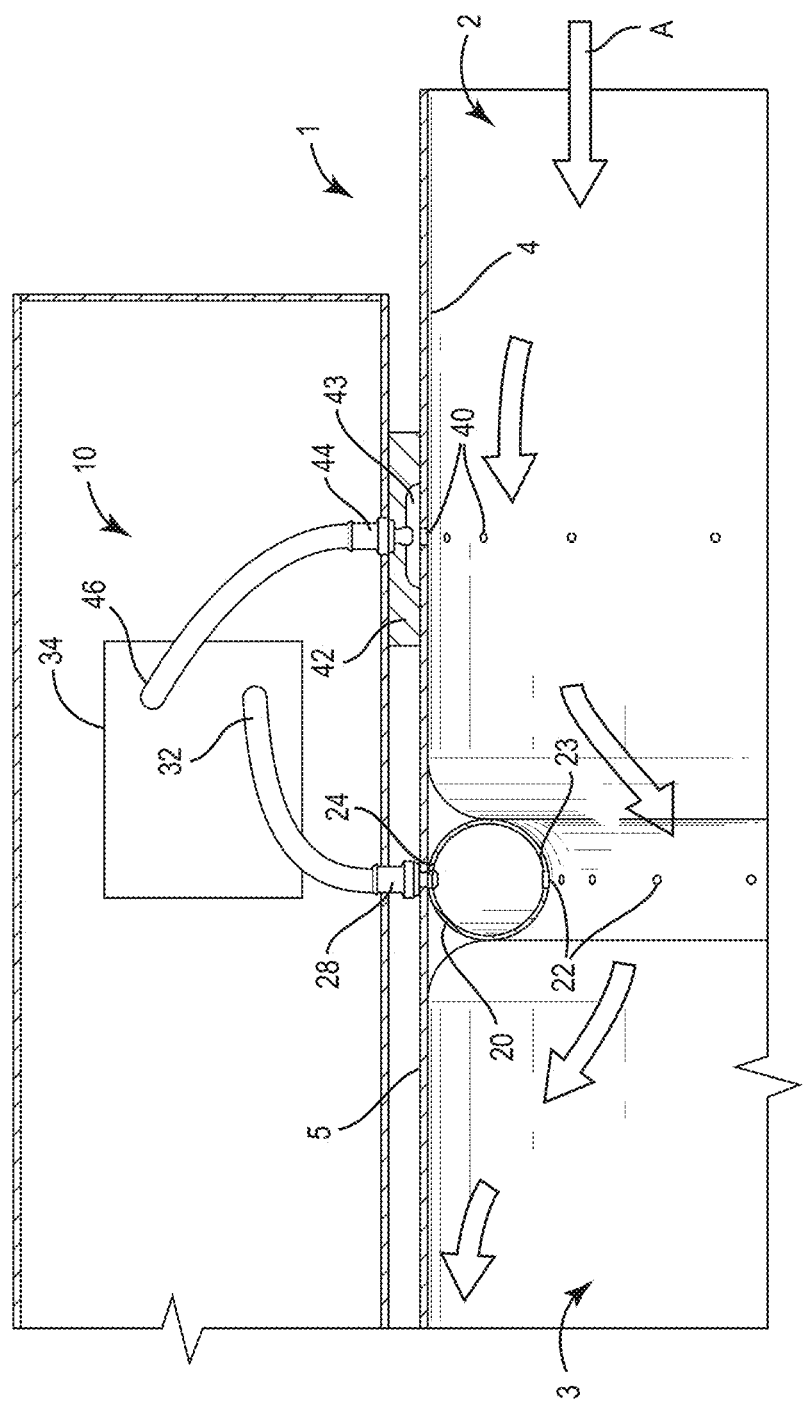
FIG. 2 is a side cross-sectional view of an air duct airflow sensor assembly, according to some embodiments.
Figure 3:
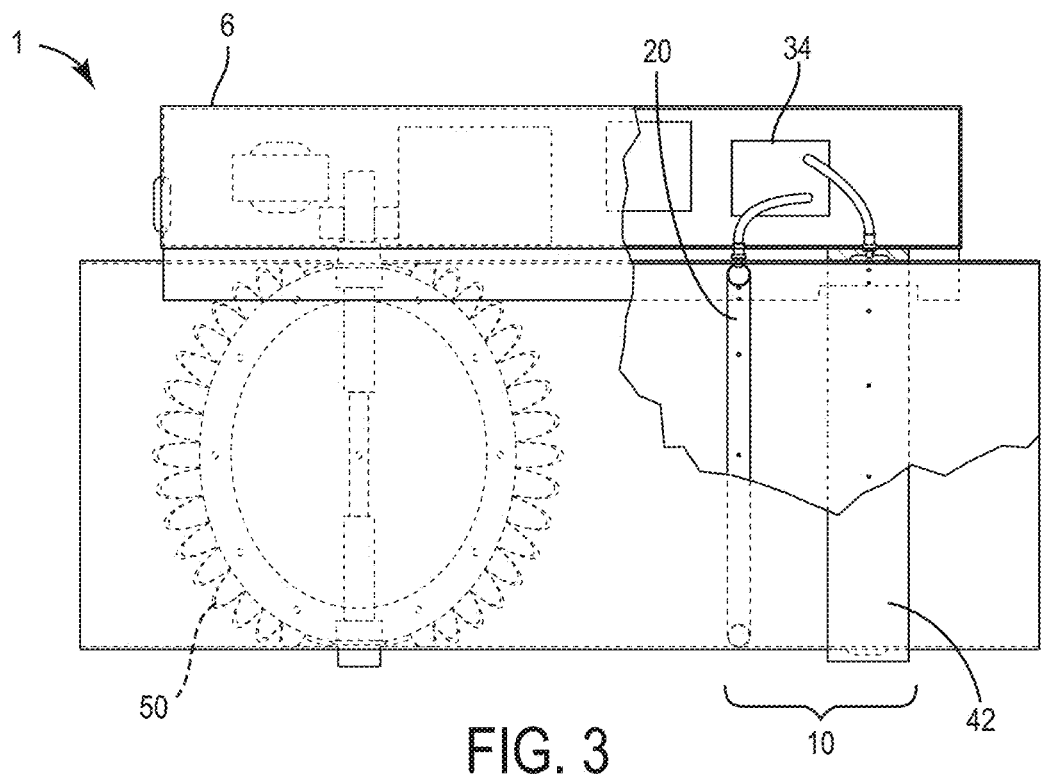
FIG. 3 is a side cutaway view of the air duct assembly of FIG. 1, according to some embodiments.
Figure 4:
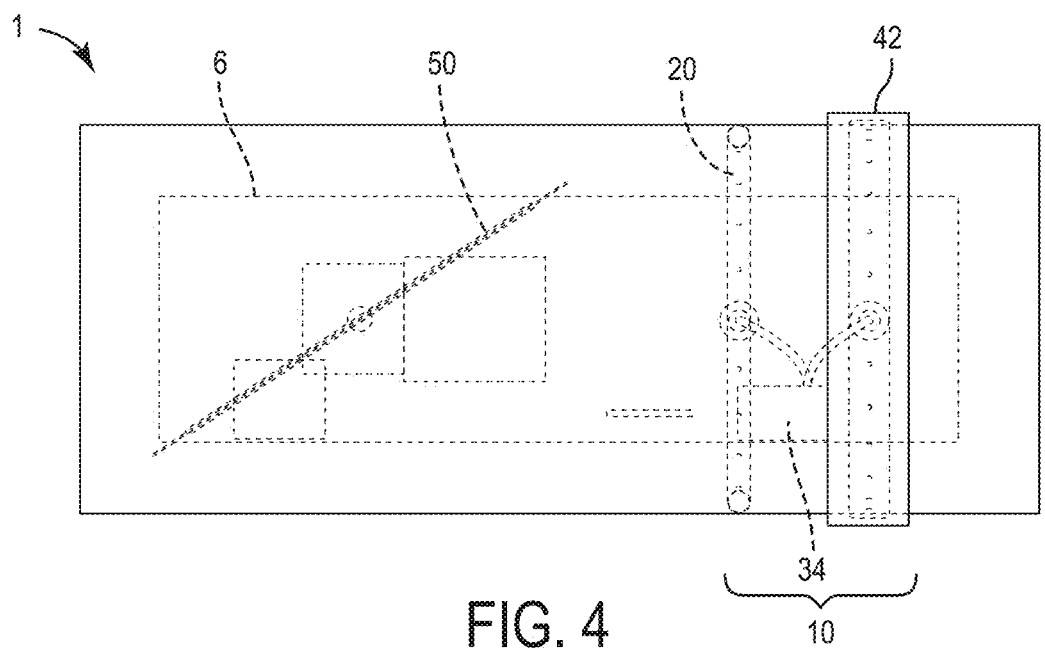
FIG. 4 is a top elevation view of the air duct assembly of FIG. 1, according to some embodiments.
Figure 5:
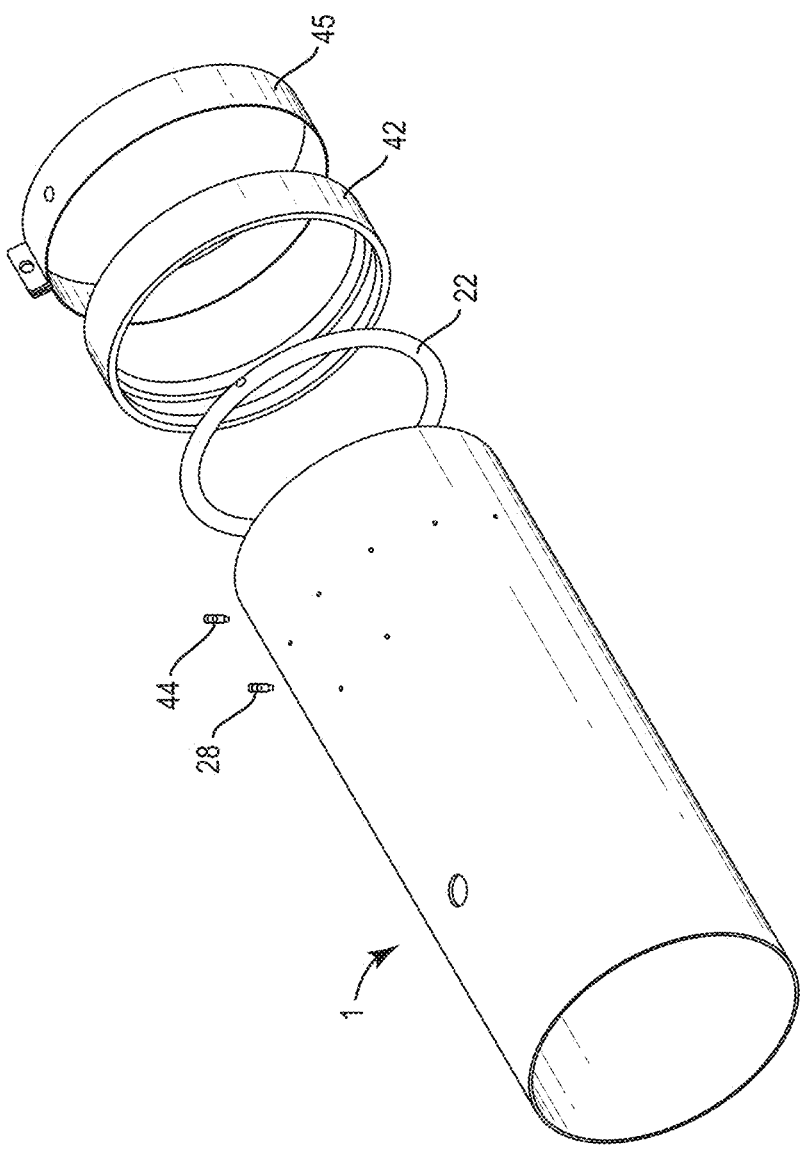
FIG. 5 is an exploded perspective view of an air duct, ring and gasket components that can be utilized in the air duct assembly of FIG. 1, according to some embodiments.
Figure 6:
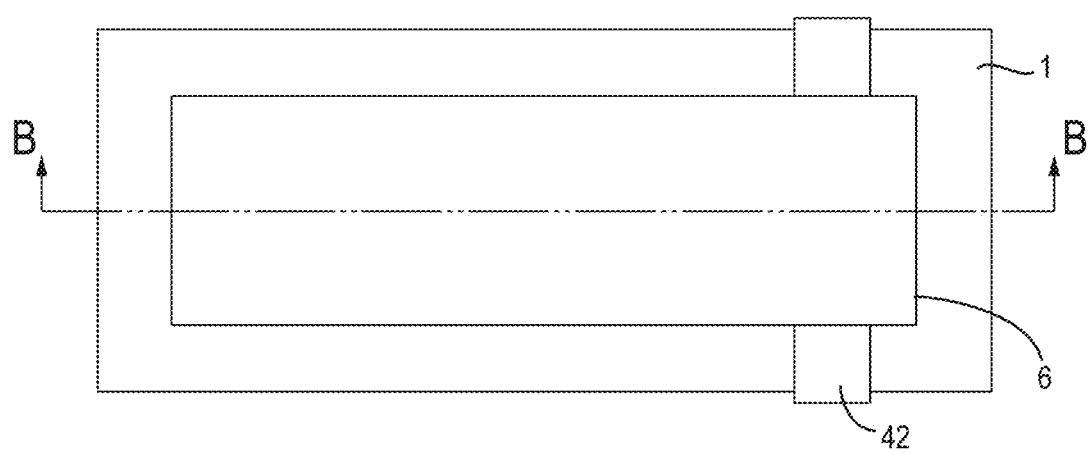
FIG. 6 is another top view of the air duct assembly of FIG. 1, according to some embodiments.
Figure 7:
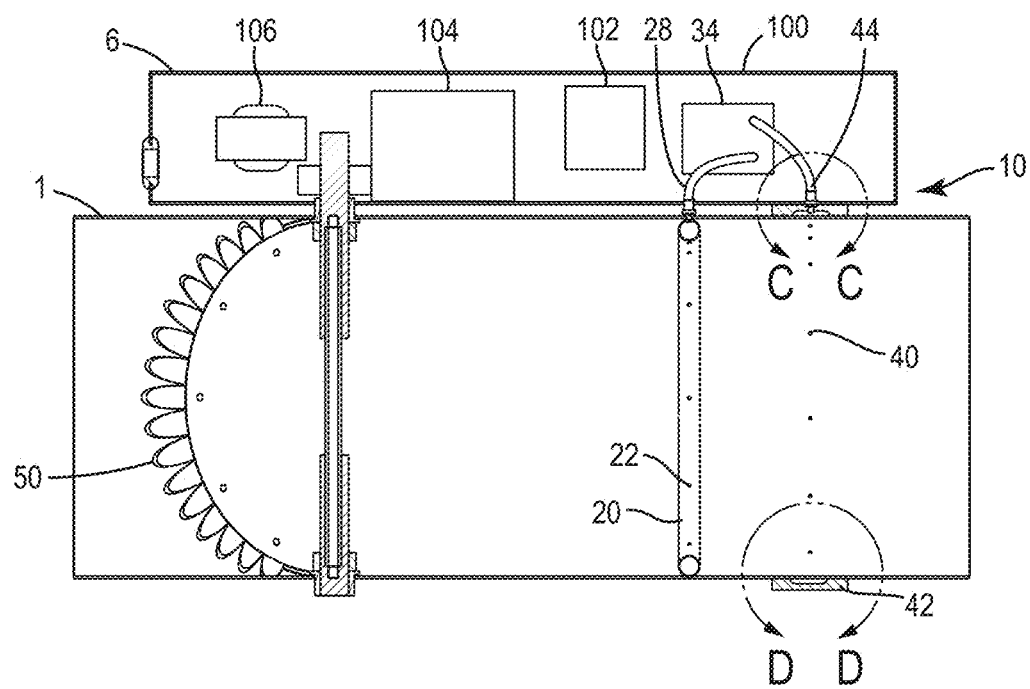
FIG. 7 is a side cross-sectional view of the air duct assembly taken along the line B-B of FIG. 6, according to some embodiments.
Figure 9:
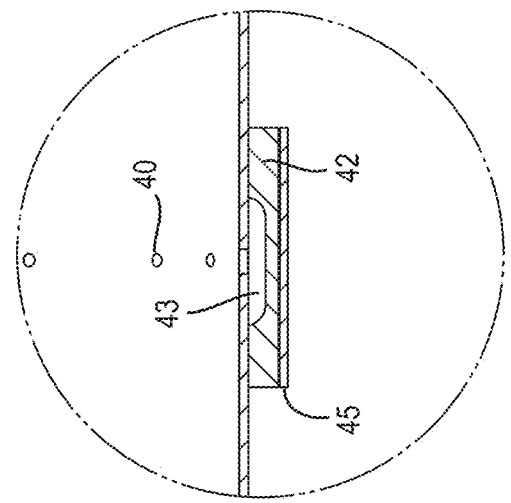
FIG. 9 is a detail view D-D of the gasket, according to some embodiments.
Figure 8:
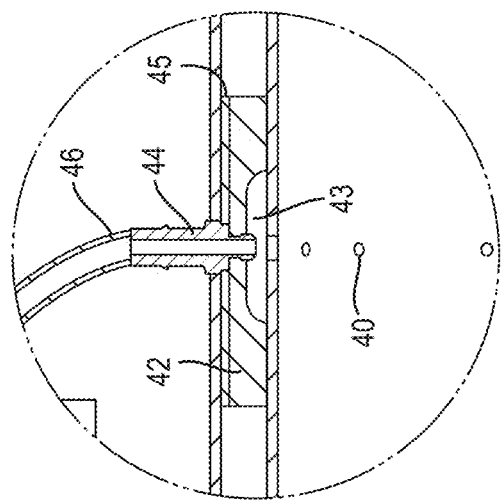
FIG. 8 is a detail view C-C of the nipple, gasket and tube, according to some embodiments.

Referring now to FIGS. 2-9, various views depicting the air duct airflow sensor assembly 10 are shown, according to some embodiments. Air may flow through the air duct airflow sensor assembly 10 in the direction indicated by arrow "A" as shown in FIG. 2. The air duct airflow sensor assembly 10 includes a low pressure detection device and a high pressure detection device. The low pressure detection device comprises a hollow ring 20 which is mounted to or otherwise associated with the interior wall 4. In some embodiments, the outer diameter of the hollow ring 20 can range from 0.5 inches to 0.75 inches. In an exemplary embodiment, the outer diameter of the hollow ring 20 is 0.625 inches. The ring 20 has a plurality of apertures 22 defined in the inner periphery 23 of the ring (versus the outer periphery 24 which is proximate to the interior wall 4). In exemplary embodiments, the apertures 22 are disposed in the inner periphery of the ring 20 such that they are generally orthogonal to the orientation of airflow, so that air flows across the apertures 22, rather than flowing into the apertures 22.

A hollow connector nipple 28 is connected to an aperture defined in the ring 20 and an aperture defined in the duct 1. A tube 32 is connected to the nipple 28. Air flowing into the apertures 22 can flow through the ring 20, into the nipple 28, and through the tube 32. The tube 32 is connected to a pressure sensor 34 such that the air flowing through the tube 32 is received and detected by the flow pressure sensor 34. The ring 20 serves two purposes: as an air collection device, and as an airflow restriction obstacle, so as to create a measurable pressure differential.

The air duct 1 further includes multiple apertures 40 defined therein, the apertures 40 being arranged generally in a ring-shape around the interior wall 4. A gasket 42 is associated with the exterior wall 5 and is located generally over the apertures 40. The gasket 42 has a recessed area 43 such that when associated with the exterior wall 5 a chamber 43 is formed. Detail views of the apertures 40 and chamber 43 are specifically depicted in FIGS. 8 and 9.

A hollow connector nipple 44 is connected to the gasket 42. In exemplary embodiments, a gasket guarding ring 45 may be used and is fitted over the gasket 42. A tube 46 is connected to the nipple 44. The tube 46 is connected to the pressure sensor 34. In an alternative exemplary embodiment, a separate pressure sensor (not shown) can be connected to the tube 46. The apertures 40, gasket 42, nipple 44, tube 46 and pressure sensor 34 form a high pressure sensor detection device.

In exemplary embodiments, the pressure sensor 34 is part of a control assembly 6 that controls the opening and closing of a damper 50. In one exemplary embodiment of a control assembly, specifically depicted in FIG. 7, a housing 100 is mounted to or otherwise associated with the air duct. A sensor 34, processor 102, actuator 104 and power supply 106 may be disposed within the housing 100. A damper 50 is in operational communication with the actuator 104.

In operation, air flowing through the duct 1 in the direction of arrow A first encounters the high pressure detection apertures 40. A portion of the air enters the apertures 40 and flows into the chamber 43. The air then moves into the tube 46 via the nipple 44, and then into the pressure sensor 34. The pressure detected is the "high" pressure in the duct 1, i.e., the pressure upstream from the airflow restrictor which is the ring 20.

Air flowing through the duct 1 next flows over the ring 20 and can enter the apertures 22 and travel through the nipple 28 and the tube 32, and into the pressure sensor 34. The pressure detected is the "low" pressure in the duct, i.e., the pressure at the point where airflow is restricted by the ring 20. The differential between the high pressure measurement and the low pressure measurement is an indication of the air velocity through the duct, specifically a scaled square root of the measured pressure (i.e., an application of Bernoulli's principle). The sensor 34 can send a signal to the control assembly 6 that in turn can cause the damper 50 to rotate so as to open or close the air duct 1.

In exemplary embodiments, the pressure sensor 34 is a "dead-end" pressure sensor (versus a flow-through sensor); i.e., after the initial pressure is established no further airflow goes through the sensor. This can reduce the chance of the apertures 22 and 40 becoming clogged.

In one exemplary embodiment, for an air duct having a 10 inch diameter, a 0.5 inch diameter ring 20 was used. With such a construction measurements of 850 CFM (cubic feet per minute) down to 35 CFM were obtainable with a 0.1 in Wg duct static. In other embodiments, a 0.625 inch diameter ring 20 may be utilized.

A benefit of the presently described sensor assembly is that because of the ring 20 design having the apertures 22 orthogonal to the airflow orientation, air to be diverted into the ring 20 flows over the apertures 22, rather than directly into the apertures 22. This can reduce the likelihood of the apertures 22 becoming clogged by dust, dirt and debris that accompanies the airstream.

Another benefit is that the presently disclosed apparatus is not dependent on airflow orientation. Typically, conventional pressure sensor apparatus, such as variable air volume ("VAV") boxes, are dependent on airflow orientation, and having a bend or other transition in the duct in the general area where the sensor can result in inaccurate measurement due to the airflow disruption that naturally occurs proximate to the bend. With the air detection means of the presently disclosed apparatus, which is not airflow orientation dependent, the sensor assembly can be located closer to a bend or other transition in the air duct without affecting pressure measurement. This provides the duct system designer with greater flexibility in designing the placement of the valve assembly.

Another benefit of the presently described sensor assembly is that it presents minimal obstruction to the airflow and thus allows for greater CFM velocity at lower duct statics. Additionally, in the event any of the apertures 22 become blocked, it is easy to carry out periodic maintenance by disconnecting the sensor 34 and introducing a blast of compressed air into the tube 32 or tube 46. Any clogging debris will be blown out of the apertures 22 or 40, respectively.

Another benefit of the presently described sensor assembly as part of an overall sensor/controller/damper design is that it can operate off of a 0-10V control signal to provide the desired airflow. This allows a designer or operator to set a required CFM with a linear control signal from a control system.

Figure 10:
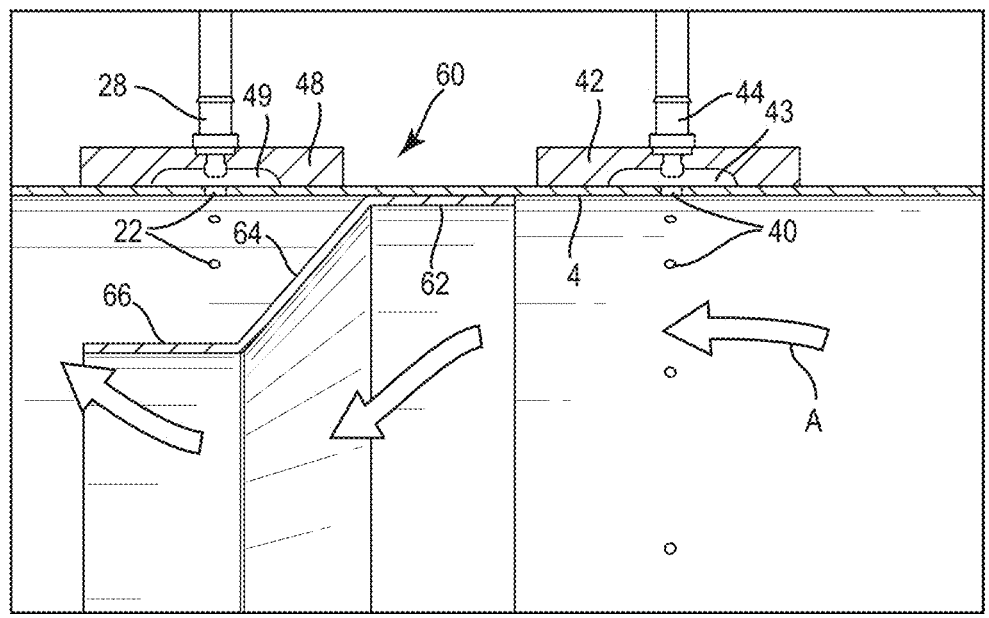
FIG. 10 is a side cross-sectional view of another air duct airflow sensor assembly, according to some embodiments.
Figure 11:
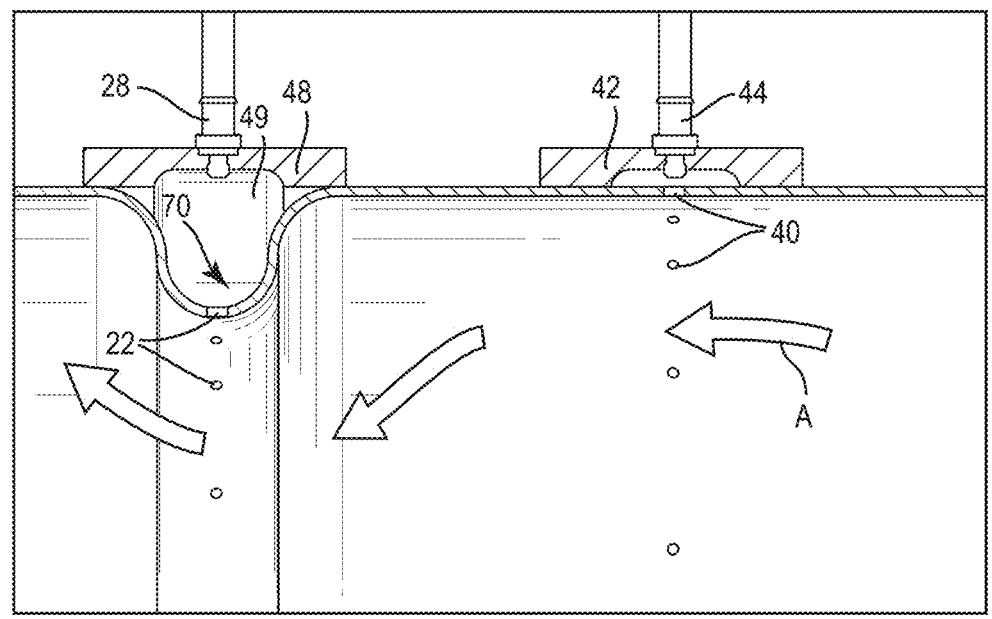
FIG. 11 is a side cross-sectional view of another air duct airflow sensor assembly, according to some embodiments.

Referring now to FIGS. 10 and 11, alternate embodiments for airflow restriction used in the low pressure detection device are depicted. Specifically, FIG. 10 depicts an airflow sensor assembly including a shroud component 60. In some embodiments, the shroud component 60 can be ring-shaped, with an interior wall attachment portion 62, an inclined portion 64, and an aperture shielding portion 66, although any suitable shroud configuration or geometry may be utilized. In some embodiments, the aperture shielding portion 66 extends from the interior wall 4 a distance ranging from 0.5 inches to 0.75 inches.

The aperture shielding portion 66 is situated proximate apertures 22 disposed within the air duct 1. A gasket 48 is associated with the exterior wall 5 and is located generally over the apertures 22. In some embodiments, one or more gasket guarding rings (not shown) may be used and fitted over the gaskets 42, 48. The gasket 48 has a recessed area 49 such that when associated with the exterior wall 5 a chamber 49 is formed. Air flowing through the duct 1 flows over the interior wall attachment portion 62, the inclined portion 64, and the aperture shielding portion 66 of the shroud component 60 and can enter the apertures 22. The air can then travel through the chamber 49 into the nipple 28. Similar to the pressure measurement process described above with reference to FIGS. 1-9, after passing through the nipple 28, the air can travel through a tube and into a pressure sensor for the purpose of controlling an air damper assembly.

Turning now to FIG. 11, an airflow sensor assembly including a channel feature 70 is depicted. Similar to the shroud component 60 described above with reference to FIG. 10, the channel feature 70 may be utilized as an air restriction feature in place of the hollow ring 20 described above with reference to FIGS. 1-9. The channel feature 70 can include multiple apertures 22 distributed about a periphery of the channel feature 70. In some embodiments, the depth of the channel feature 70 can range from 0.5 inches to 0.75 inches. In an exemplary embodiment, the depth of the channel feature 70 is 0.625 inches. In other words, if the air duct 1 is nominally 10 inches in diameter, the diameter may expand to 11.25 inches in the region of the channel feature 70.

A gasket 48 is associated with the exterior wall 5 and is located generally over the apertures 22. In some embodiments, one or more gasket guarding rings (not shown) may be used and fitted over the gaskets 42, 48. The gasket 48 has a recessed area 49 such that when associated with the exterior wall 5 a chamber 49 is formed. Air flowing through the duct 1 flows over the channel feature 70 and can enter the apertures 22. The air can then travel through the chamber 49 into the nipple 28. Similar to the pressure measurement process described above with reference to FIGS. 1-9, after passing through the nipple 28, the air can travel through a tube and into a pressure sensor for the purpose of controlling an air damper assembly.

As used in the specification and the appended claims, the singular forms "a," "an" and "the" include plural referents unless the context clearly dictates otherwise.

"Optional' or "optionally" means that the subsequently described event or circumstance may or may not occur, and that the description includes instances where said event or circumstance occurs and instances where it does not.

Throughout the description and claims of this specification, the word "comprise" and variations of the word, such as "comprising' and "comprises," means "including but not limited to," and is not intended to exclude, for example, other additives, components, integers or steps. "Exemplar" means "an example of" and is not intended to convey an indication of a preferred or ideal embodiment. "Such as" is not used in a restrictive sense, bur for explanatory purposes.

Disclosed are components that can be used to perform the disclosed methods, equipment and systems. These and other components are disclosed herein, and it is understood that when combinations, subsets, interactions, groups, etc., of these components are disclosed that while specific reference of each various individual and collective combination and permutation of these may not be explicitly disclosed, each is specifically contemplated and described herein, for all methods, equipment and systems. This applies to all aspects of this application including, but not limited to, steps in disclosed methods. Thus, if there ae a variety of additional steps that can be performed it is understood that each of these additional steps can be performed with any specific embodiment or combination of embodiments of the disclosed methods.

It should further be noted that any patents, applications and publications referred to herein are incorporated by reference in their entirety.

What is claimed is:

1. An airflow sensor assembly for an air duct, the air duct having an interior wall and an exterior wall; comprising:
   a high pressure detection device;
   a low pressure detection device, comprising:
      a hollow ring configured to be disposed within the interior wall of the air duct, the hollow ring having an inner periphery portion and an outer periphery portion; and
      a first plurality of apertures defined therein and spaced around the inner periphery portion of the hollow ring; and
   a pressure sensor configured to be fluidly coupled to the high pressure detection device and the low pressure detection device.

2. The airflow sensor assembly of claim 1, wherein the low pressure detection device further comprises:
   a first connecting opening disposed within the outer periphery portion of the hollow ring; and
   a first tube fluidly coupled to the first connecting opening.

3. The airflow sensor assembly of claim 2, wherein the high pressure detection device comprises:
   a second plurality of apertures defined therein and spaced around an inner periphery of the air duct;
   a gasket having a recessed area defined therein and a second connecting opening, the gasket being fitted over the exterior wall and proximate the second plurality of apertures; and
   a second tube fluidly coupled to the second connecting opening.

4. The airflow sensor assembly of claim 3, wherein the pressure sensor is fluidly coupled to the first tube and the second tube.

5. The airflow sensor assembly of claim 3, further comprising a gasket guard ring configured to fit over an exterior surface of the gasket.

6. The airflow sensor assembly of claim 1, further comprising a damper control assembly communicably coupled to the pressure sensor.

7. The airflow sensor assembly of claim 6, wherein the damper control assembly comprises an air damper assembly, a motor, and an actuator.

8. The airflow sensor assembly of claim 1, wherein each of the first plurality of apertures is orthogonal to a direction of airflow through the air duct.

9. The airflow sensor assembly of claim 1, wherein the hollow ring has an outer diameter ranging from 0.5 inches to 0.75 inches.

10. An airflow sensor assembly for an air duct, the air duct having an interior wall and an exterior wall; comprising:
    a high pressure detection device;
    a low pressure detection device, comprising:
       an airflow restrictor; and
       a first plurality of apertures defined therein and spaced around a periphery of the air duct;
       a first gasket having a recessed area defined therein and a first connecting opening, the first gasket being fitted over the exterior wall and proximate the first plurality of apertures and the airflow restrictor; and
       a first tube fluidly coupled to the first connecting opening; and
    a pressure sensor configured to be fluidly coupled to the high pressure detection device and the low pressure detection device.

11. The airflow sensor assembly of claim 10, wherein the airflow restrictor comprises a shroud component coupled with the interior wall of the air duct.

12. The airflow sensor assembly of claim 10, wherein the airflow restrictor comprises a channel disposed in the interior wall of the air duct.

13. The airflow sensor assembly of claim 10, wherein the high pressure detection device comprises:
    a second plurality of apertures defined therein and spaced around the periphery of the air duct;
    a second gasket having a recessed area defined therein and a second connecting opening, the second gasket being fitted over the exterior wall and proximate the second plurality of apertures; and
    a second tube fluidly coupled to the second connecting opening.

14. The airflow sensor assembly of claim 13, wherein the pressure sensor is fluidly coupled to the first tube and the second tube.

15. The airflow sensor assembly of claim 10, further comprising a plurality of gasket guard rings configured to fit over at least one of an exterior surface of the first gasket or an exterior surface of a second gasket.

16. The airflow sensor assembly of claim 10, further comprising a damper control assembly communicably coupled to the pressure sensor.

17. The airflow sensor assembly of claim 16, wherein the damper control assembly comprises an air damper assembly, a motor, and an actuator.

18. A method of sensing airflow in an air duct, the method comprising:
    receiving a high air pressure measurement from a high pressure detection device;
    receiving a low air pressure measurement from a low pressure detection device, the low pressure detection device comprising:
       a hollow ring disposed within an interior wall of the air duct, the hollow ring having an inner periphery portion and an outer periphery portion; and
       a first plurality of apertures defined therein and spaced around the inner periphery portion of the hollow ring;
       a first connecting opening disposed within the outer periphery portion of the hollow ring; and
       a first tube fluidly coupled to the first connecting opening; and
    calculating an air velocity through the air duct based on the high air pressure measurement and the low air pressure measurement.

19. The method of claim 18, wherein the high pressure detection device comprises:
    a second plurality of apertures defined therein and spaced around an inner periphery of the air duct;
    a gasket having a recessed area defined therein and a second connecting opening, the gasket being fitted over an exterior wall of the air duct and proximate the second plurality of apertures; and
    a second tube fluidly coupled to the second connecting opening.

20. The method of claim 18, wherein each of the first plurality of apertures is orthogonal to a direction of airflow through the air duct.

* * * * *